(12) United States Patent
Rawlings et al.

(10) Patent No.: US 10,946,559 B2
(45) Date of Patent: Mar. 16, 2021

(54) MULTILAYER RIBLET APPLIQUE AND METHODS OF PRODUCING THE SAME

(71) Applicant: The Boeing Company, Chicago, IL (US)

(72) Inventors: Diane C. Rawlings, Bellevue, WA (US); Bruce K. Keough, Olympia, WA (US); Larry K. Olli, Seattle, WA (US); Alan G. Burg, Des Moines, WA (US); James M. Kestner, Seattle, WA (US); George Michael Granger, Redmond, WA (US); James Charles McGarvey, Meridian, ID (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/148,760

(22) Filed: Oct. 1, 2018

(65) Prior Publication Data
US 2019/0030764 A1 Jan. 31, 2019

Related U.S. Application Data

(62) Division of application No. 15/205,460, filed on Jul. 8, 2016, now Pat. No. 10,105,877.

(51) Int. Cl.
*B29C 39/12* (2006.01)
*B32B 27/28* (2006.01)
(Continued)

(52) U.S. Cl.
CPC .......... *B29C 39/123* (2013.01); *B29C 39/146* (2013.01); *B29C 39/148* (2013.01);
(Continued)

(58) Field of Classification Search
CPC ... B64C 21/10; B64C 2230/26; Y10T 428/28; Y10T 428/2457; Y10T 428/24537;
(Continued)

(56) References Cited

U.S. PATENT DOCUMENTS

| 4,093,487 A | 6/1978 | Gaworowski et al. |
| 4,650,138 A | 3/1987 | Grose |

(Continued)

FOREIGN PATENT DOCUMENTS

| CN | 103039138 | 4/2013 |
| EP | 2070688 | 6/2009 |

(Continued)

OTHER PUBLICATIONS

United States Patent and Trademark Office, "Notice of Allowance and Fee(s) Due," issued in connection with U.S. Appl. No. 14/705,569, dated Sep. 28, 2017, 4 pages.

(Continued)

*Primary Examiner* — Catherine A. Simone
(74) *Attorney, Agent, or Firm* — Hanley, Flight & Zimmerman, LLC

(57) ABSTRACT

Multilayer riblet applique and methods of producing the same are described herein. One disclosed example method includes applying a first high elongation polymer material to a web tool, where the web tool is to be provided from a first roll, and heating, via a first heating process, the first high elongation polymer material. The disclosed example method also includes applying a second high elongation polymer material to the first high elongation polymer material, and heating, via a second heating process, the second high elongation polymer material. The disclosed example method also includes applying, via a laminating roller, a support layer to the second high elongation polymer material.

20 Claims, 10 Drawing Sheets

(51) Int. Cl.

| | |
|---|---|
| *B32B 3/30* | (2006.01) |
| *B64C 21/10* | (2006.01) |
| *B32B 37/20* | (2006.01) |
| *B32B 37/10* | (2006.01) |
| *B32B 37/00* | (2006.01) |
| *B32B 37/02* | (2006.01) |
| *B32B 37/24* | (2006.01) |
| *B29C 39/14* | (2006.01) |
| *B29C 39/18* | (2006.01) |
| *B29C 39/38* | (2006.01) |
| *B32B 33/00* | (2006.01) |
| *B29C 41/30* | (2006.01) |
| *B29C 41/32* | (2006.01) |
| *B29C 41/46* | (2006.01) |
| *B29C 39/16* | (2006.01) |
| *B29C 65/78* | (2006.01) |
| *B29L 7/00* | (2006.01) |
| *B29L 31/00* | (2006.01) |
| *B29L 9/00* | (2006.01) |
| *B29K 101/12* | (2006.01) |
| *B29L 31/30* | (2006.01) |

(52) U.S. Cl.
CPC ............. *B29C 39/16* (2013.01); *B29C 39/18* (2013.01); *B29C 39/38* (2013.01); *B29C 41/30* (2013.01); *B29C 41/32* (2013.01); *B29C 41/46* (2013.01); *B29C 65/7894* (2013.01); *B32B 3/30* (2013.01); *B32B 27/283* (2013.01); *B32B 33/00* (2013.01); *B32B 37/10* (2013.01); *B32B 37/203* (2013.01); *B64C 21/10* (2013.01); *B29K 2101/12* (2013.01); *B29L 2007/00* (2013.01); *B29L 2009/00* (2013.01); *B29L 2031/3076* (2013.01); *B29L 2031/756* (2013.01); *B32B 37/0053* (2013.01); *B32B 37/02* (2013.01); *B32B 37/24* (2013.01); *B32B 2037/243* (2013.01); *B32B 2371/00* (2013.01); *B32B 2375/00* (2013.01); *B32B 2398/20* (2013.01); *B32B 2605/18* (2013.01); *B64C 2230/26* (2013.01)

(58) Field of Classification Search
CPC ..... Y10T 428/24355; Y10T 428/24479; Y10T 428/24612; B63B 1/36; C09J 7/20; C09J 7/22; C09J 7/28; C09J 7/29; C09J 2201/162; B32B 3/28; B32B 3/30; B32B 27/283; B32B 37/10; B32B 37/203; B32B 37/0053; B32B 37/02; B32B 37/24; B32B 2371/00; B32B 2398/20; B32B 2037/243; B32B 2375/00; B32B 2605/18; B29C 39/123; B29C 39/146; B29C 39/148; B29C 39/16; B29C 39/18; B29C 39/38; B29C 41/30; B29C 41/32; B29C 41/46; B29C 65/7894; B29K 2101/12; B29L 2007/00; B29L 2009/00; B29L 2031/3076; B29L 2031/756
USPC .............................. 428/167, 40.1, 343, 354
See application file for complete search history.

(56) References Cited

U.S. PATENT DOCUMENTS

| | | |
|---|---|---|
| 4,706,910 A | 11/1987 | Walsh et al. |
| 4,736,912 A | 4/1988 | Loebert |
| 4,865,271 A | 9/1989 | Savill |
| 4,897,146 A | 1/1990 | Inzinna |
| 4,930,729 A | 6/1990 | Savill |
| 4,932,612 A | 6/1990 | Blackwelder et al. |
| 4,994,053 A | 2/1991 | Lang |
| 5,054,412 A | 10/1991 | Reed et al. |
| 5,069,403 A | 12/1991 | Marentic et al. |
| 5,133,516 A | 7/1992 | Marentic et al. |
| 5,133,519 A | 7/1992 | Falco |
| 5,445,095 A | 8/1995 | Reed et al. |
| 5,456,785 A | 10/1995 | Venable |
| 5,505,543 A | 4/1996 | Webbeking et al. |
| 5,520,717 A | 5/1996 | Miller et al. |
| 5,637,873 A | 6/1997 | Davis et al. |
| 5,766,306 A | 6/1998 | Olli et al. |
| 5,766,764 A | 6/1998 | Olli et al. |
| 5,860,626 A | 1/1999 | Moser |
| 5,874,167 A | 2/1999 | Rawlings et al. |
| 5,971,326 A | 10/1999 | Bechert |
| 6,177,189 B1 | 1/2001 | Rawlings et al. |
| 6,191,248 B1 | 2/2001 | Rawlings et al. |
| 6,345,791 B1 | 2/2002 | McClure |
| 6,376,063 B1 | 4/2002 | Rasmussen et al. |
| 6,475,616 B1 | 11/2002 | Dietz et al. |
| 6,524,675 B1 | 2/2003 | Mikami et al. |
| 6,699,579 B2 | 3/2004 | Rasmussen et al. |
| 6,958,207 B1 | 10/2005 | Khusnatdinov et al. |
| 6,982,794 B1 | 1/2006 | Davis et al. |
| 6,994,045 B2 | 2/2006 | Paszkowski |
| 7,041,363 B2 | 5/2006 | Krohmer et al. |
| 7,044,073 B2 | 5/2006 | Goldstein |
| 7,052,586 B2 | 5/2006 | Rasmussen et al. |
| 7,070,850 B2 | 7/2006 | Dietz et al. |
| 7,221,513 B2 | 5/2007 | Cho et al. |
| 7,224,529 B2 | 5/2007 | King et al. |
| 7,298,554 B2 | 11/2007 | Cho et al. |
| 7,417,798 B2 | 8/2008 | King et al. |
| 7,444,932 B2 | 11/2008 | Strand et al. |
| 7,445,409 B2 | 11/2008 | Trice et al. |
| 7,525,785 B2 | 4/2009 | Rawlings |
| 7,544,407 B1 | 6/2009 | Rawlings et al. |
| 7,678,997 B2 | 3/2010 | Rawlings |
| 7,703,179 B2 | 4/2010 | Ferguson et al. |
| 7,755,670 B2 | 7/2010 | Utagawa |
| 7,757,591 B2 | 7/2010 | Trice et al. |
| 7,807,229 B2 | 10/2010 | Rawlings et al. |
| 7,864,501 B2 | 1/2011 | Rawlings et al. |
| 7,867,621 B2 | 1/2011 | Rawlings et al. |
| 7,931,841 B2 | 4/2011 | Huizinga et al. |
| 7,940,462 B2 | 5/2011 | Noguchi et al. |
| 8,038,102 B2 | 10/2011 | Miller et al. |
| 8,113,469 B2 | 2/2012 | Lang |
| 8,220,754 B2 | 7/2012 | McClure et al. |
| 8,286,909 B2 | 10/2012 | Lee |
| 8,292,226 B2 | 10/2012 | Sankrithi et al. |
| 8,343,298 B2 | 1/2013 | Rawlings et al. |
| 8,413,928 B2 | 4/2013 | Rawlings et al. |
| 8,444,092 B2 | 5/2013 | Li et al. |
| 8,460,779 B2 | 6/2013 | Gupta et al. |
| 8,578,747 B2 | 11/2013 | Li et al. |
| 8,668,166 B2 | 3/2014 | Rawlings et al. |
| 8,678,316 B2 | 3/2014 | Rawlings et al. |
| 8,684,310 B2 | 4/2014 | Rawlings et al. |
| 8,687,342 B2 | 4/2014 | Rawlings et al. |
| 8,715,824 B2 | 5/2014 | Rawlings et al. |
| 8,733,702 B1 | 5/2014 | Rawlings et al. |
| 8,794,574 B2 | 8/2014 | Lang |
| 8,870,124 B2 | 10/2014 | Ireland |
| 8,876,052 B2 | 11/2014 | Rawlings et al. |
| 9,017,797 B2 | 4/2015 | Goelling |
| 9,272,791 B2 | 3/2016 | Brennan et al. |
| 9,297,394 B2 | 3/2016 | Li et al. |
| 9,352,533 B2 | 5/2016 | Rawlings et al. |
| 9,371,141 B2 | 6/2016 | Rawlings et al. |
| 9,714,083 B2 | 7/2017 | Rawlings |
| 9,751,618 B2 | 9/2017 | Rawlings et al. |
| 9,868,135 B2 | 1/2018 | Williams et al. |
| 10,105,877 B2 | 10/2018 | Rawlings et al. |
| 2002/0082542 A1 | 6/2002 | Hall |
| 2003/0133121 A1 | 7/2003 | Davis et al. |
| 2004/0028907 A1 | 2/2004 | Wang |
| 2004/0126541 A1 | 7/2004 | Dietz et al. |
| 2004/0200932 A1 | 10/2004 | Scott et al. |

(56) References Cited

U.S. PATENT DOCUMENTS

| | | | |
|---|---|---|---|
| 2005/0094277 | A1 | 5/2005 | Khusnatdinov et al. |
| 2005/0181203 | A1 | 8/2005 | Rawlings et al. |
| 2006/0051592 | A1 | 3/2006 | Rawlings et al. |
| 2006/0060722 | A1 | 3/2006 | Choi et al. |
| 2007/0060026 | A1 | 3/2007 | Sung |
| 2007/0194178 | A1 | 8/2007 | Lang |
| 2007/0257400 | A1 | 11/2007 | Stenzel et al. |
| 2008/0061192 | A1 | 3/2008 | Sullivan |
| 2008/0233356 | A1 | 9/2008 | Loher et al. |
| 2010/0080958 | A1 | 4/2010 | Goelling |
| 2010/0108813 | A1 | 5/2010 | Lang |
| 2010/0127125 | A1 | 5/2010 | Li et al. |
| 2010/0187359 | A1* | 7/2010 | Rawlings ............... F15D 1/004 244/130 |
| 2010/0187360 | A1 | 7/2010 | Rawlings et al. |
| 2010/0187361 | A1 | 7/2010 | Rawlings et al. |
| 2010/0282909 | A1 | 11/2010 | Rawlings et al. |
| 2010/0308177 | A1 | 12/2010 | McClure et al. |
| 2011/0006165 | A1 | 1/2011 | Ireland |
| 2011/0008174 | A1 | 1/2011 | Ireland |
| 2011/0073710 | A1 | 3/2011 | Rawlings et al. |
| 2011/0186685 | A1 | 8/2011 | Tsotsis et al. |
| 2011/0262705 | A1 | 10/2011 | Gupta et al. |
| 2011/0274875 | A1 | 11/2011 | Lang |
| 2012/0025025 | A1 | 2/2012 | Brennan et al. |
| 2012/0227453 | A1 | 9/2012 | Li et al. |
| 2013/0028744 | A1 | 1/2013 | Nordin et al. |
| 2013/0062004 | A1 | 3/2013 | Amirehteshami et al. |
| 2013/0107278 | A1 | 5/2013 | Meyer et al. |
| 2013/0193270 | A1 | 8/2013 | Rawlings et al. |
| 2013/0257055 | A1 | 10/2013 | Simpson |
| 2014/0023837 | A1 | 1/2014 | Miller et al. |
| 2014/0099475 | A1 | 4/2014 | Rawlings et al. |
| 2014/0110263 | A1 | 4/2014 | Barbier et al. |
| 2014/0116597 | A1 | 5/2014 | Miller et al. |
| 2014/0130318 | A1 | 5/2014 | Rohr et al. |
| 2014/0174642 | A1 | 6/2014 | Rawlings et al. |
| 2014/0238646 | A1 | 8/2014 | Enright |
| 2014/0242285 | A1 | 8/2014 | Pettersson et al. |
| 2014/0248453 | A1 | 9/2014 | Li et al. |
| 2014/0248469 | A1 | 9/2014 | Rawlings et al. |
| 2014/0255632 | A1 | 9/2014 | Gradert et al. |
| 2014/0272237 | A1 | 9/2014 | Roper et al. |
| 2014/0295143 | A1 | 10/2014 | Rawlings et al. |
| 2014/0332631 | A1 | 11/2014 | Rawlings et al. |
| 2014/0356219 | A1 | 12/2014 | Gammel et al. |
| 2014/0363637 | A1 | 12/2014 | Kovach et al. |
| 2015/0017385 | A1 | 1/2015 | Lang |
| 2015/0037542 | A1 | 2/2015 | Nadella et al. |
| 2015/0053289 | A1 | 2/2015 | Kurtovic et al. |
| 2015/0136909 | A1 | 5/2015 | Kruckenberg et al. |
| 2016/0107371 | A1 | 4/2016 | Hurme et al. |
| 2016/0159466 | A1 | 6/2016 | Daggett et al. |
| 2016/0168685 | A1 | 6/2016 | Surply et al. |
| 2016/0243586 | A1 | 8/2016 | Travis |
| 2016/0271930 | A1 | 9/2016 | Roper et al. |
| 2016/0325818 | A1 | 11/2016 | Williams et al. |
| 2016/0325823 | A1 | 11/2016 | Rawlings et al. |
| 2016/0325824 | A1 | 11/2016 | Rawlings |
| 2018/0009136 | A1 | 1/2018 | Rawlings et al. |

FOREIGN PATENT DOCUMENTS

| | | |
|---|---|---|
| WO | 03000483 | 1/2003 |
| WO | 2005038862 | 4/2005 |
| WO | 2011037719 | 3/2011 |
| WO | 2012082667 | 6/2012 |

OTHER PUBLICATIONS

European Patent Office, "European Search Report," issued in connection with European Application No. 16162961.3, dated Sep. 13, 2016, 9 pages.

United States Patent and Trademark Office, "Final Office action," issued in connection with U.S. Appl. No. 14/705,569, dated Oct. 14, 2016, 22 pages.

European Patent Office, "European Search Report," issued in connection with European Application No. 16167099.7, dated Nov. 11, 2016, 8 pages.

European Patent Office, "European Search Report," issued in connection with European Application No. 16167118.5, dated Nov. 11, 2016, 8 pages.

United States Patent and Trademark Office, "Non-final Office action," issued in connection with U.S. Appl. No. 14/705,547, dated Nov. 3, 2016, 35 pages.

Casey et al., "Embossing of Nanoscale Features and Environments," Microelectronic Engineering, 35 (1997) pp. 393-366, 4 pages.

United States Patent and Trademark Office, "Non-final Office action," issued in connection with U.S. Appl. No. 14/705,569, dated Feb. 1, 2017, 26 pages.

United States Patent and Trademark Office, "Non-final Office action," issued in connection with U.S. Appl. No. 14/705,569, dated Jun. 21, 2016, 26 pages.

United States Patent and Trademark Office, "Non-final Office action," issued in connection with U.S. Appl. No. 14/705,564, dated Aug. 10, 2016, 32 pages.

United States Patent and Trademark Office, "Notice of Allowance and Fee(s) Due," issued in connection with U.S. Appl. No. 15/205,460, dated Jun. 28, 2018, 22 pages.

United States Patent and Trademark Office, "Restriction Requirement," issued in connection with U.S. Appl. No. 15/205,460, dated Aug. 31, 2017, 10 pages.

European Patent Office, "European Search Report," issued in connection with European Application No. 17180327.3, dated Dec. 6, 2017, 10 pages.

United States Patent and Trademark Office, "Final Office action," issued in connection with U.S. Appl. No. 14/705,569, dated May 19, 2017, 10 pages.

United States Patent and Trademark Office, "Non-final Office action," issued in connection with U.S. Appl. No. 14/705,569, dated Feb. 1, 2017, 11 pages.

United States Patent and Trademark Office, "Notice of Allowance and Fee(s) Due," issued in connection with U.S. Appl. No. 14/705,547, dated May 8, 2017, 8 pages.

United States Patent and Trademark Office, "Notice of Allowance and Fee(s) Due," issued in connection with U.S. Appl. No. 14/705,564, dated Mar. 1, 2017, 5 pages.

United States Patent and Trademark Office, "Non-Final Office action," issued in connection with U.S. Appl. No. 15/205,460, dated Dec. 29, 2017, 9 pages.

Canada Intellectual Property Office, "Examination Report," issued in Canadian Patent Application No. 2,967,682, dated Jul. 3, 2020, 4 pages.

Chinese Patent Office, "Notification of the First Office Action," issued in connection with Chinese Patent Application No. 2017105527113, dated Jul. 10, 2020, 18 pages. Summarized English translation included.

Canadian Intellectual Property Office, "Office Action," issued in connection with Canadian Patent Application No. 2,967,682, dated Dec. 3, 2020, 3 pages.

* cited by examiner

MULTILAYER RIBLET APPLIQUE AND METHODS OF PRODUCING THE SAME

RELATED APPLICATION

This patent arises as a divisional of U.S. patent application Ser. No. 15/205,460, entitled "MULTILAYER RIBLET APPLIQUE AND METHODS OF PRODUCING THE SAME," filed Jul. 8, 2016. Priority to U.S. patent application Ser. No. 15/205,460 is hereby claimed. U.S. patent application Ser. No. 15/205,460 is hereby incorporated herein by reference in its entirety.

FIELD OF THE DISCLOSURE

This patent relates generally to aircraft and, more particularly, to multilayer riblet applique and methods of producing the same.

BACKGROUND

Microstructures such as riblets are typically used on an aircraft to alter flight characteristics and/or dynamics of the aircraft. In particular, the riblets are used on surfaces of a wing, a fin or a fuselage of the aircraft to reduce drag and/or a drag coefficient of the aircraft, which can result in overall fuel savings and/or reduction in carbon-dioxide emissions, etc. Riblets may also be used to provide traction (e.g., for stepping, etc.) for personnel (e.g., maintenance personnel).

The riblets can have a multilayered construction and are typically adhered to aircraft surfaces using an adhesive (e.g., adhered or applied as an applique). In particular, the riblets are multilayered for different functions including aesthetics, grounding and geometric/physical requirements (e.g., flow altering capabilities and/or durability). In known examples, it is important for riblets with layered construction to have reliable and consistent bonding and/or curing between layers because the riblets can be exposed to high loads associated with flight. As a result, the riblets may be designed and manufactured to minimize premature wear, delamination of the riblets and/or separation of the riblets from an aircraft surface (e.g., a surface of an aircraft fuselage).

SUMMARY

The example methods and apparatus provide reliable and consistent bonding and/or curing between layers of multi-layered riblet constructions. The examples disclosed herein include effective binding of these layers by producing effective interlayer bonds. In particular, at least partially curing a high elongation polymer (e.g., a fluorosilicone material, etc.) prior to another high elongation material being applied may provide robust interlayer bonding, for example. In some examples, use of fluorosilicone materials may also greatly improve interlayer bonding and/or overall improved robustness of the riblet construction.

An example method includes applying a first high elongation polymer material to a web tool, where the web tool is to be provided from a first roll, and heating, via a first heating process, the first high elongation polymer material. The example method also includes applying a second high elongation polymer material to the first high elongation polymer material, and heating, via a second heating process, the second high elongation polymer material. The example method also includes applying, via a laminating roller, a support layer to the second high elongation polymer material.

Another example method includes dispensing a web tool from a first roll; applying a first high elongation polymer material to the web tool. The example method also includes applying, via first roller, a riblet liner to the first high elongation polymer material to define a first layered construction. The example method also includes placing the first layered construction onto a first rewind roll, curing the first layered construction, and dispensing the first layered construction from the first rewind roll. The example method also includes removing the riblet liner via a removal reel, applying a second high elongation polymer material to the first high elongation polymer material, and applying, via a second roller, a support layer to the second high elongation polymer material to define a second layered construction. The example method also includes placing the second layered construction onto a second rewind roll, and curing the second layered construction.

An example apparatus includes a fluorosilicone riblet structure that includes riblet ridges and a base from which the riblet ridges extend, and a fluorosilicone layer adjacent the fluorosilicone riblet structure. The example apparatus also includes a support layer proximate the base, where the support layer includes a metal sub-layer, an adhesive sub-layer and at least one thermoplastic sub-layer.

Another example method includes casting a fluorosilicone riblet tip structure using a web tool provided from a first roll, where casting the fluorosilicone riblet tip structure includes applying a first fluorosilicone material to the web tool as the web tool is unrolled from the first roll. The example method also includes applying a fluorosilicone layer to the fluorosilicone riblet tip structure, where the fluorosilicone layer includes a second fluorosilicone material, and applying, via a laminating roller, a support layer adjacent to the fluorosilicone layer.

Another example apparatus includes a first dispenser to apply a first fluorosilicone material to a web tool that is unrolled from a first roll, a second dispenser to apply a second fluorosilicone material to the first fluorosilicone material, and a laminating roller to couple a support layer to the second fluorosilicone layer.

Another example apparatus includes a first dispenser to apply a first high elongation polymer material to a web tool that is unrolled from a first roll, and a second dispenser to apply a second high elongation polymer material to the first high elongation polymer material. The example apparatus also includes a laminating roller to couple a support layer to the second high elongation polymer layer, and at least one oven to at least partially cure at least one of the first and second high elongation polymer materials.

Figure 1:
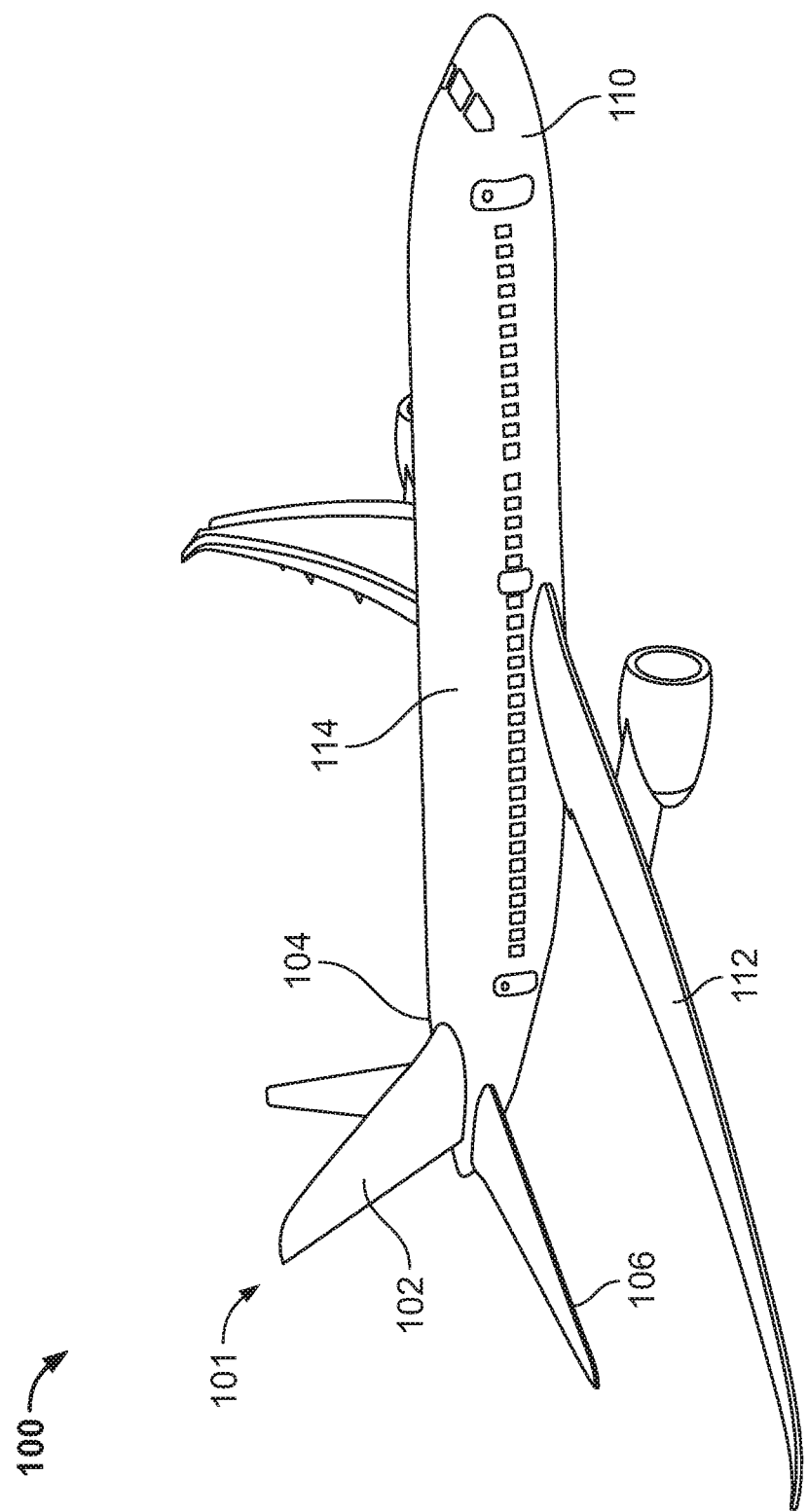
FIG. 1 illustrates an example aircraft that may be used to implement the example methods and apparatus disclosed herein.

Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Multilayer riblet applique and methods of producing the same are disclosed herein. Microstructures such as riblets, for example, are typically used on aerodynamic surfaces of an aircraft to alter and/or improve flight characteristics to reduce an overall drag of the aircraft, for example and, thus, may result in overall fuel savings and/or reduction in carbon-dioxide emissions, etc. In particular, the riblets are used on surfaces of a wing, a fin or a fuselage of the aircraft to reduce drag and/or a drag coefficient of the aircraft, which can result in overall fuel savings and/or reduction in carbon-dioxide emissions, etc. These riblets, for example, can have a multilayered construction and are typically adhered to aircraft surfaces using an adhesive (e.g., as a multilayered applique). The riblets are multilayered for different functions including aesthetics, grounding and/or geometric/physical requirements (e.g., flow altering capabilities and/or durability) and can be subject to significant loading (e.g., wind loads, etc.) during flight, for example. Thus, effective interlayer bonding and/or assembly of this multilayered construction can greatly reduce and/or prevent delamination of the riblet itself or separation of the riblet from an aircraft surface (e.g., a surface of an aircraft fuselage) due to significant loads encountered during flight, for example.

The example methods disclosed herein enable production of multilayered riblet applique structures (e.g., multilayered riblet structures) that are resistant to delamination and/or separation of layers. In particular, the examples disclosed herein are related to methods that very effectively bind together layers of riblet applique structures. Further, the examples disclosed herein also enable quicker and more efficient manufacturing of these multilayer assemblies/constructions. In particular, the examples disclosed herein include multiple curing processes to more effectively bind/cure the layers. In some examples, the multiple curing processes are inline processes (performed at a production/assembly line). Alternatively, in some examples, at least one of the curing processes is performed off-line (e.g., away from a production/assembly line) to allow production lines to be used primarily for assembly.

As used herein, the terms "riblet," "riblet construction" or "riblet structure" may refer to geometric features, dimensions and/or distances between geometric features (e.g., periodic distances, heights and/or widths, etc.) that define, form, couple and/or support riblets. Therefore, the terms "riblet," "riblet construction" or "riblet structure" may refer to any of a riblet layer, a riblet assembly and/or a multilayered riblet construction, etc.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. The examples described herein may be applied to surfaces and/or features (e.g., riblets) of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface of the aircraft 100.

Figure 2:
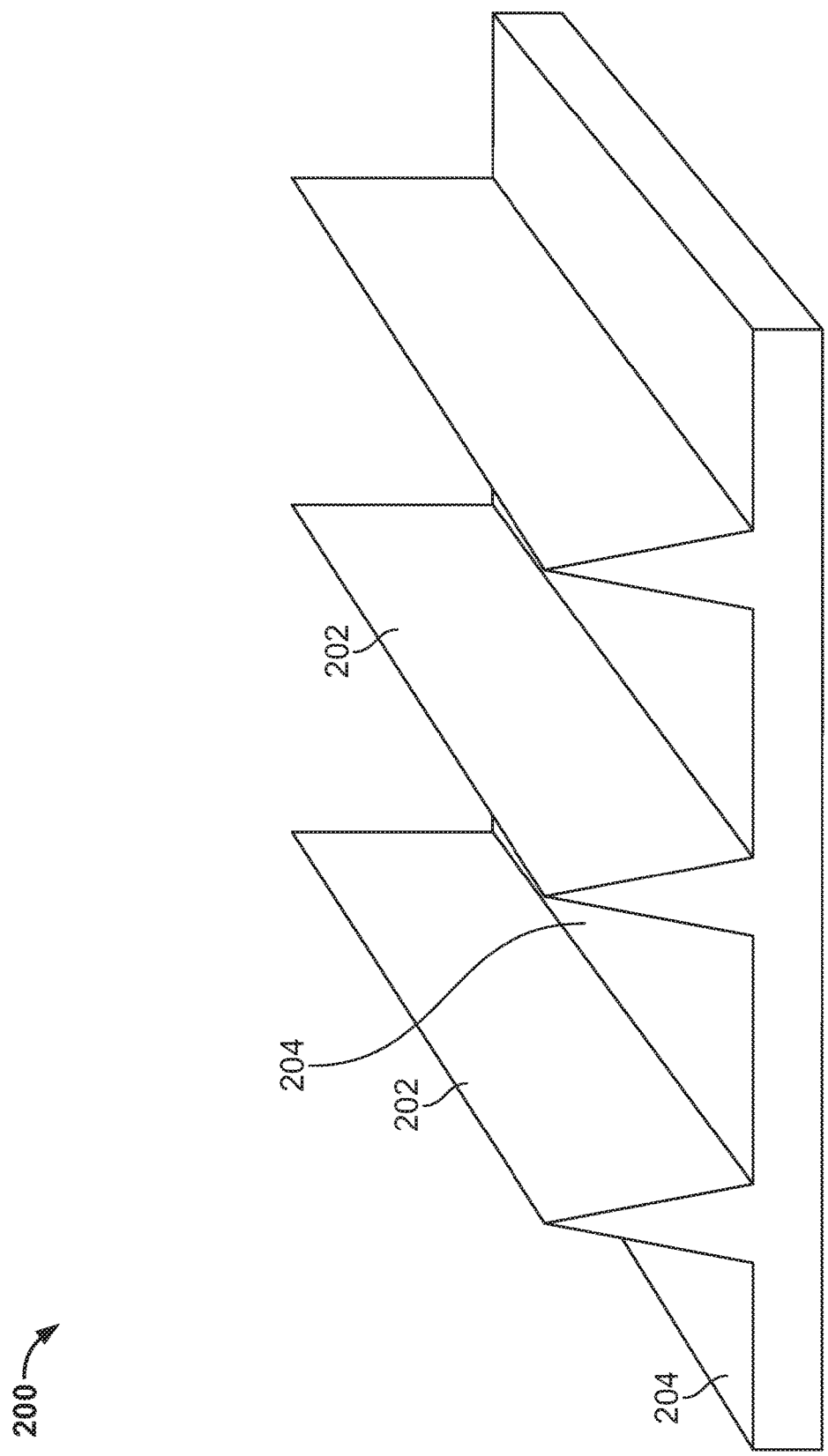
FIG. 2 is an example riblet microstructure from an external surface of the example aircraft of FIG. 1 on which the examples disclosed herein may be implemented.

FIG. 2 is an example riblet structure 200 of an external surface of the example aircraft 100 of FIG. 1 on which the examples disclosed herein may be implemented. The riblet structure 200 of the illustrated example includes ridges (e.g., wedges) 202, which are spaced apart from one another, and base surfaces (e.g., valleys, aircraft surfaces, etc.) 204 that space the ridges 202 apart from one another. In this example, the profiles of the ridges 202 are generally triangular, thereby defining ridges/wedges having generally triangular cross-sections. The ridges 202 may be spaced apart at distances of approximately 10-200 microns, for example. A profile of the riblet structure 200 is cast/molded to define the riblet structure 200 (e.g., a defined volume of the riblet structure 200), as will be discussed in greater detail below in connection with FIGS. 4-10. While the example riblet structure 200 is cast/molded in this example, the riblet structure 200 may be formed by extruding, embossing, pressing, thermo-forming, machining, etc. In other examples, the base surfaces 204 may have ridges and/or other features/geometries that are smaller than the ridges 202.

In this example, the riblet structure 200 is a riblet of the aircraft 100 and is used to alter the aerodynamic characteristics of the aircraft 100 by reducing an overall drag of the aircraft 100, for example, and may be located on any external surface of the aircraft 100. The riblet structure 200 of the illustrated example is used to reduce aerodynamic drag by controlling the turbulent boundary layers and/or preventing cross-flows associated with a turbulent boundary layer in air near an external surface of the aircraft 100, as described above in connection with FIG. 1. In particular, the example riblet structure 200 includes the ridges 202 and is installed on the external surface of the aircraft 100 and aligned with a desired direction of airflow. This alignment allows the ridges 202 to act as small fences or guides that disrupt and reduce lateral airflow motions near the external surface to enhance in-line turbulent airflow and reduce skin friction of the external surface, thereby reducing overall drag of the aircraft 100. In some examples, the riblet structure 200 is not attached or installed on the external surface during or after manufacturing of the aircraft 100 but, rather, is integral with the external surface. For example, the riblet structure 200 may be pre-formed or embedded into or on the external surface (e.g., machined or molded/cast onto a skin surface, built into a composite cured part, robotically placed, etc.) instead of being coupled (e.g., mechanically adhered) to the external surface. While the example riblet structure 200 is shown as having triangular ridges 202, the ridges 202 may be any other appropriate shape including round, rectangular, etc.

Figure 3:
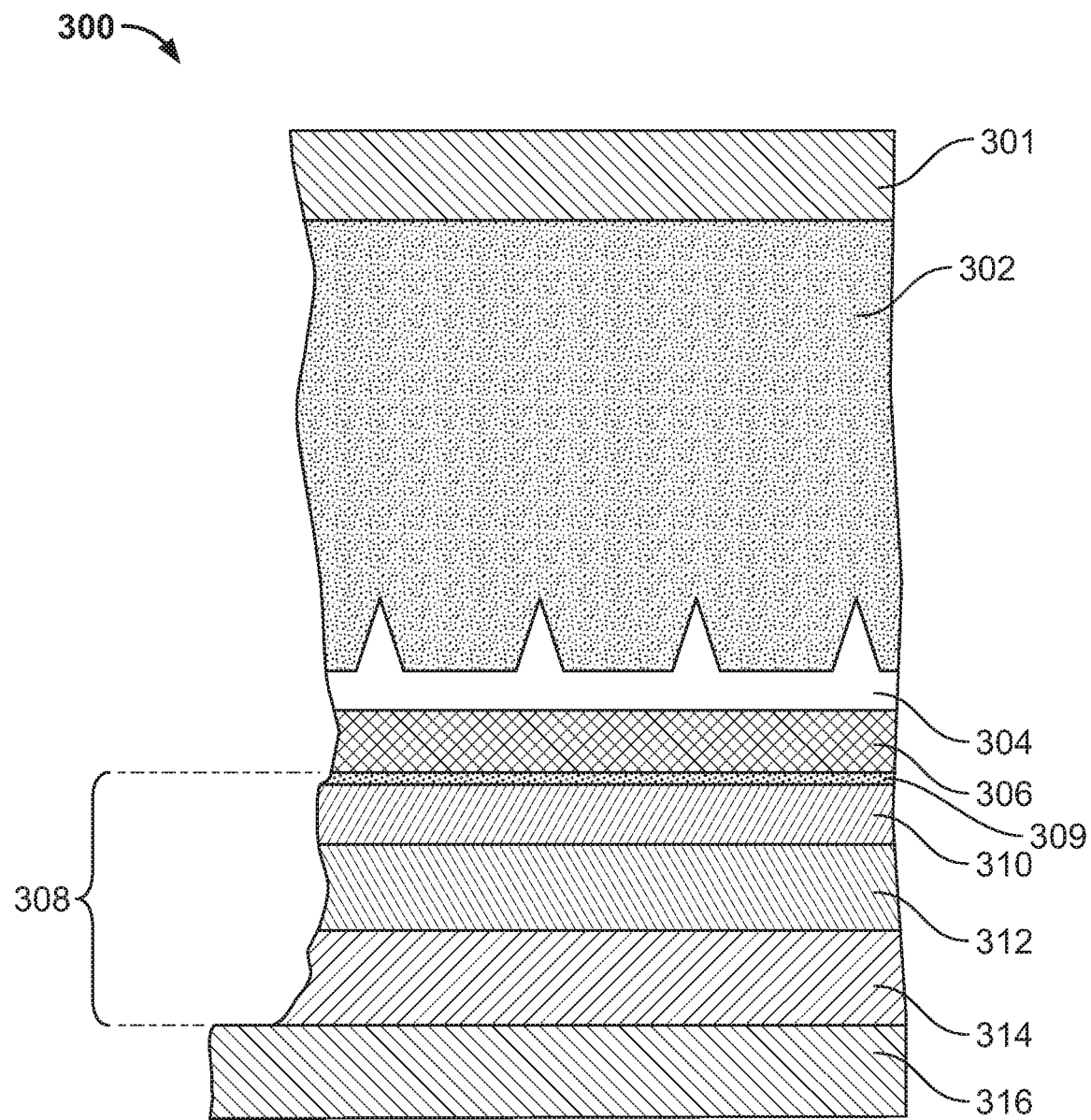
FIG. 3 is a cross-sectional view of an example layered riblet structure in accordance with the teachings of this disclosure.

FIG. 3 is a detailed cross-sectional view of an example layered (e.g., multilayered) riblet structure (e.g., a riblet applique, a riblet construction, a riblet assembly, a riblet applique structure, a riblet, etc.) 300 in accordance with the teachings of this disclosure. In the view of FIG. 3, the riblet structure 300 is shown prior to being assembled and/or adhered to an aircraft surface. As can also be seen in FIG. 3, the riblet structure 300 of the illustrated example has multiple layers including a masking support layer (e.g., an adhesive layer) 301, a masking interface portion (e.g., a protective interface portion) 302, a first fluorosilicone layer (e.g., a riblet tip structure, a clear riblet tip structure, etc.) 304, which defines a pattern of riblet tips/wedges and valleys, a second fluorosilicone layer 306, which is a color layer in this example but may be transparent in other examples, and a support layer (also known as a base applique) 308. The support layer 308 of the illustrated example includes a metal foil sub-layer 309, a first polymer sub-layer 310, which is a thermoplastic material (e.g., polyether ether ketone (PEEK), polyether ketone ketone (PEKK), polyether amide (PEI), etc.) in this example, a second polymer sub-layer 312, which is also a thermoplastic material in this example, and a pressure sensitive adhesive sub-layer 314. In this example, the first and second fluorosilicone layers 304, 306 are different materials. However, in other examples, the first and second fluorosilicone layers 304, 306 may be identical materials.

While the first and second fluorosilicone layers 304, 306 of the illustrated example are fluorosilicone, in other examples, these layers may include any high elongation elastomer such as epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and other hybrid polymers that include polyhedral oligomeric silsesquioxane, etc.

To couple the riblet structure 300 to an aircraft and/or vehicle surface, the riblet structure 300 also includes a removable liner 316, which is removed to expose the pressure sensitive adhesive sub-layer 314. Further, while the masking interface portion 302 of the illustrated example is used to protect the riblet structure 300 and/or the first fluorosilicone layer 304 (e.g., riblet tips of the first fluorosilicone layer 304) during manufacturing, shipping and/or storage, the masking is removed upon installation of the riblet structure 300 (e.g., during installation of the riblet structure 300 to a surface of an aircraft).

Figure 4:
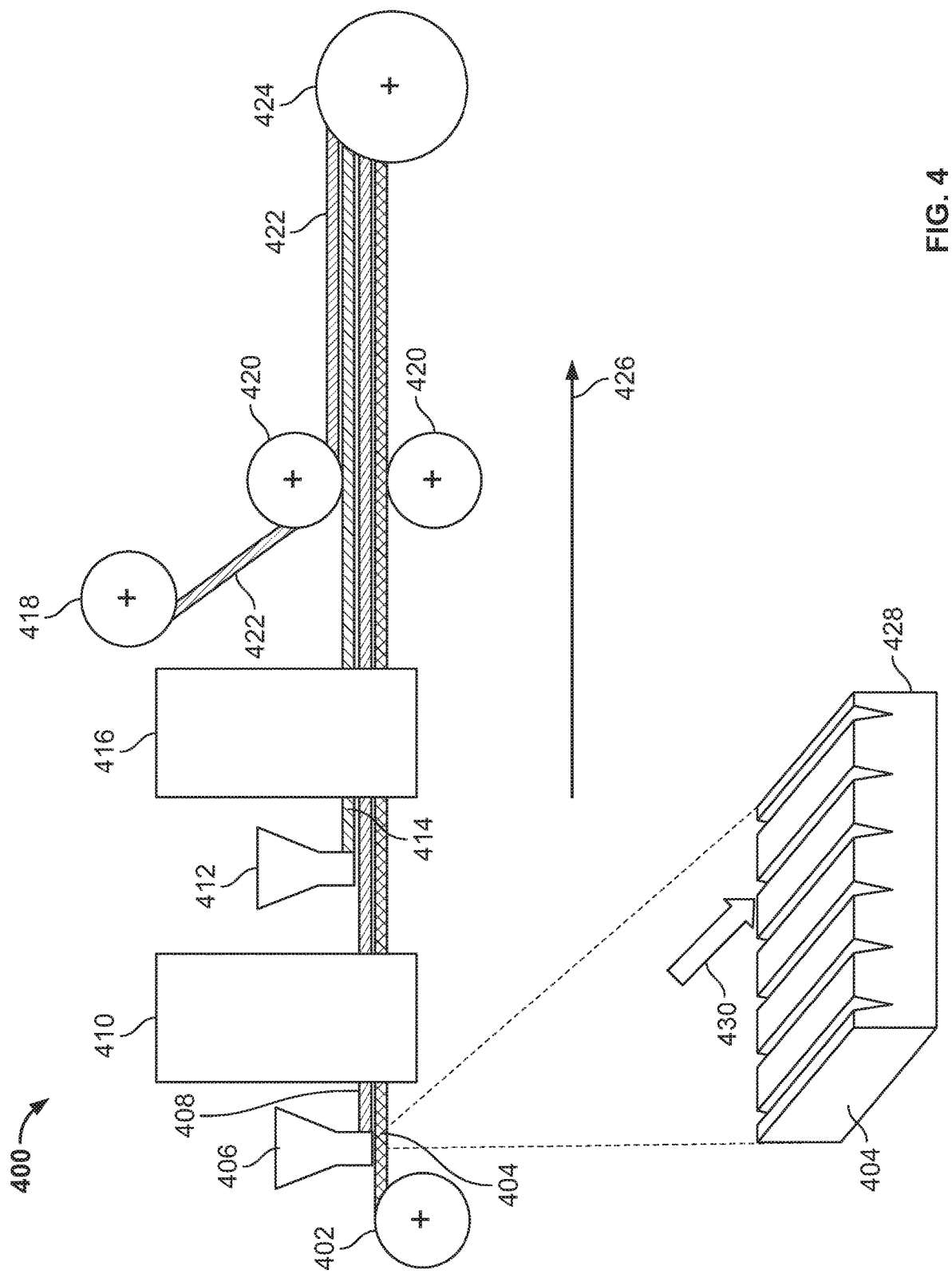
FIG. 4 illustrates an example riblet layering system that may be used to produce the example layered riblet structure shown in FIG. 3.

FIG. 4 illustrates an example riblet layering system 400 that may be used to produce the example layered riblet structure 300 shown in FIG. 3. The example riblet layering system 400 includes an unwind roll 402, a web tool 404, a first fluorosilicone material dispenser (e.g., applicator) 406, a first fluorosilicone material 408, a first oven 410, a second fluorosilicone material dispenser 412, a second fluorosilicone material 414, a second oven 416, a support layer unwind roll 418, support layer laminating rollers (e.g., laminating nip rollers, application rollers, opposing nip rollers) 420, a support layer 422 and a rewind roll (e.g. a product roll) 424. While the example riblet layering system 400 is utilized to produce the example layered riblet structure 300, the example layering system 400 may be modified to produce a different multilayered structure construction (e.g., a different number of fluorosilicone layers, a different layering order, etc.) with desired characteristics that are appropriate for the application to be used in.

In operation, production (e.g., assembly) of multilayered riblet structures is accomplished by providing/assembling layers and/or subcomponents as material moves along a direction of movement 426 generally indicated by an arrow. In particular, the web tool 404 of the illustrated example is uncoiled from the unwind roll 402 and moved along the direction 426 indicated by the arrow as various inline processes are performed (e.g., assembly and/or curing processes) to produce the multilayered riblet structures. As can be seen in FIG. 4, the web tool 404 includes a cross-sectional profile 428, which is used to define the shape of a riblet pattern that includes riblet peaks as well as valleys. An arrow generally indicates a direction of travel 430 of the web tool 404 in relationship to its respective cross-sectional profile 428. Additionally or alternatively, the web tool 404 defines a desired surface finish, optics and/or texture.

To produce the multilayered riblet applique assemblies, after the web tool 404 is provided (e.g., uncoiled) from the unwind roll 402, the first fluorosilicone material 408 is dispensed (e.g., dispensed in liquid/melted form) onto profiled surfaces of the web tool 404 as the web tool 404 moves along the direction 426 of the arrow. In other words, the first fluorosilicone material 408 of the illustrated example is cast/molded by the profiled surfaces that are defined by the cross-sectional profile 428 of the web tool 404 as the web tool 404 moves from the unwind roll 402. In this example, an appropriate amount (e.g., appropriate for dimensions of a riblet and/or an application of use for the riblet applique) of the first fluorosilicone material 408 to define both the ridges 202 and the base surfaces 204 described above in connection with FIG. 2. In this example, the first oven 410 cures and/or partially cures the first fluorosilicone material 408 as the first fluorosilicone material 408 moves therethrough. In particular, the first oven 410 is at least partially enclosed and the first fluorosilicone material 408 is moved within the oven 410 by the web tool 404 along an interior length of the first oven 410. The second fluorosilicone material 414 is provided to the first fluorosilicone material 408 (e.g., cast/molded in liquid form onto the first fluorosilicone material 408). In this example, the second oven 416 provides heat to the first fluorosilicone material 408 and the second fluorosilicone material 414 to at least partially cure the second fluorosilicone material 414. The support layer unwind roll 418 provides the support layer 422 to the second fluorosilicone material 414. In particular, the rollers 420 are used to laminate the support layer 422 to the second fluorosilicone material 414 (e.g., an exposed surface of the second fluorosilicone material 414). Finally, an assembled and cured (e.g., partially cured, fully cured) multilayer riblet applique is wound/rolled up onto the rewind roll 424. In some examples, at least one of the ovens 410, 416 utilize a conveyor to move the multilayer riblet applique assemblies as they are being produced.

While the example riblet layering system 400 of FIG. 4 depicts multiple ovens, in some examples, the first and second ovens 410, 416 are unitary. For example, the web tool 404 is directed to travel in a path that passes through a single oven twice (e.g., the web tool 404 is redirected back into the first oven 410 after the second fluorosilicone material 414 is applied). For example, the first oven 410 may be used to cure both the first fluorosilicone material 408 and the second fluorosilicone material 414 in different steps. Similarly, the second oven 416 may be used to cure (e.g., fully cure) both the first fluorosilicone material 408 and the second fluorosilicone material 414 at different steps. For example, fully curing both the first fluorosilicone material 408 and the second fluorosilicone material 414 may enable the first fluorosilicone material 408 and/or the second fluorosilicone material 414 to be coupled to a masking and/or masking assembly with reduced risk of damage. Additionally or alternatively, the first and second ovens 410, 416 may use radiative and/or convective heating, for example. In some examples, the first fluorosilicone material 408 is partially cured in the first oven 410 and further cured in the second oven 416. In some examples, any of the rollers/rolls may be motorized and/or operatively coupled to a motor. Alternatively, the first oven 410 and/or the second oven 416 may be a room temperature curing process. Additionally or alternatively, in some examples, the web tool 404 is removed prior to placement of the first fluorosilicone material 408 and/or the second fluorosilicone material 414 into at least one of the respective ovens 410, 416.

Figure 5:
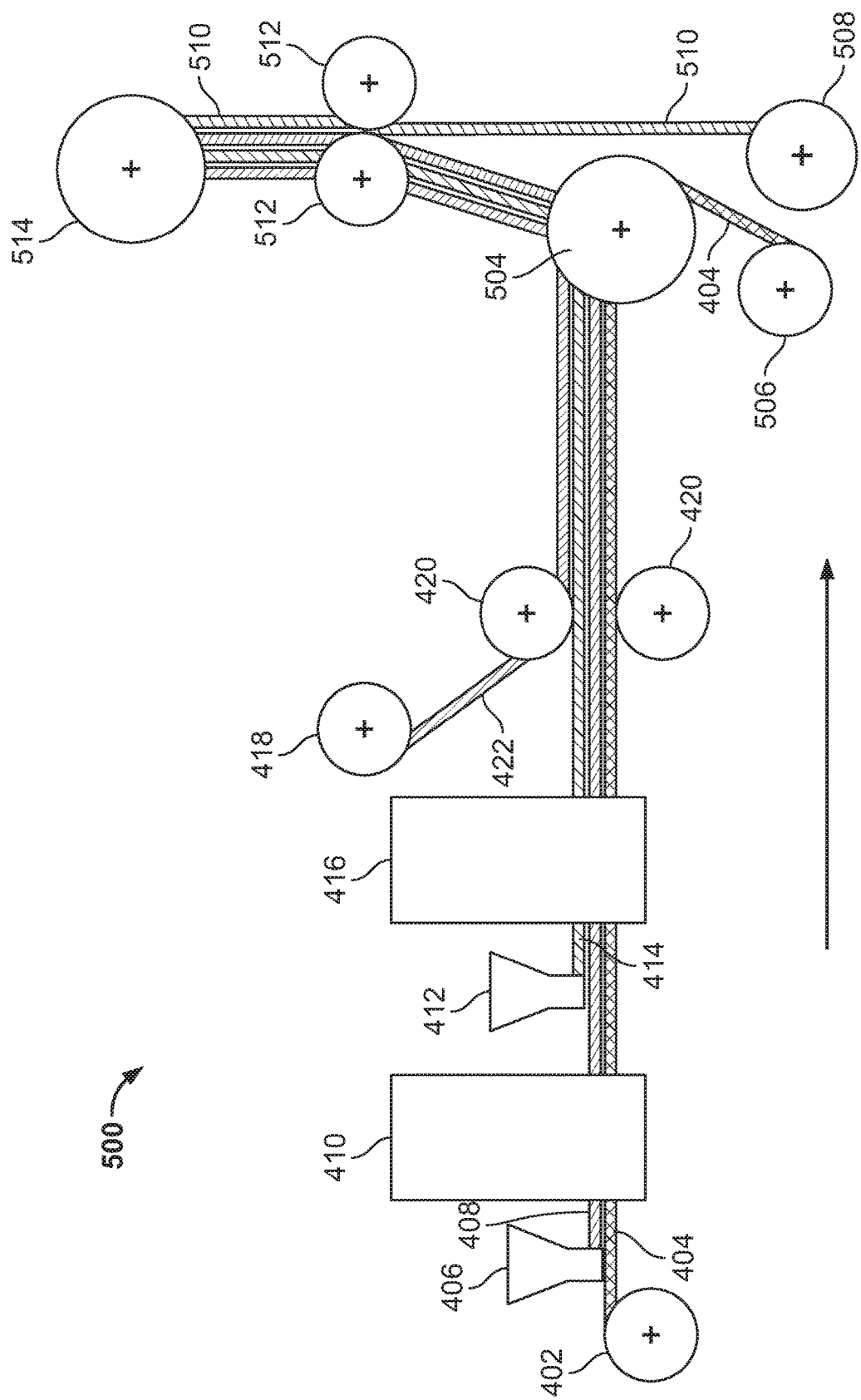
FIG. 5 illustrates another example riblet layering system.

FIG. 5 illustrates another example riblet layering system 500. The example riblet layering system 500 is similar to the riblet layering system 400 of FIG. 4, but instead of the rewind roll 424, includes a redirect reel 504. The riblet layering system 500 of the illustrated example also includes a removal roll/reel (e.g., a web tool removal reel) 506, a masking supply roll/reel 508, which provides a masking 510, which may include and/or define the masking support layer 301 and/or the masking interface portion 302, masking application pinch rollers (e.g., pinch rollers, masking rollers) 512 and a rewind roll 514.

In operation, as the layers of the first and second fluorosilicone material 408, 414, move along with the support layer 422 after the support layer 422 has been added/laminated, the web tool 404 is removed at the removal roll 506, thereby defining an exposed surface of the layer of the first fluorosilicone material 408. After the web tool 404 has been removed, the rollers 512 laminate the masking 510 to the first fluorosilicone material 408 to define a finished riblet applique. Subsequently, this finished riblet applique is stored onto (e.g., coiled around) the rewind roll 514.

In some examples, the web tool 404 acts as a continuous conveyor for transporting components and/or layers of the riblet applique. In particular, the web tool 404 of the illustrated example may be fed from the removal roll 506 to the unwind roll 402. In some examples, the redirect reel 504 is used to alter and/or vary a direction of travel of one or more components that eventually define the finished riblet applique, thereby varying interlayer forces between one or more layers. In particular, at least one of the first fluorosilicone material 408, the second fluorosilicone material 414 or the support layer 422 may be angled away at different directions between an entry point and an exit point of the redirect reel 504 to alter interlayer forces.

Figure 6:
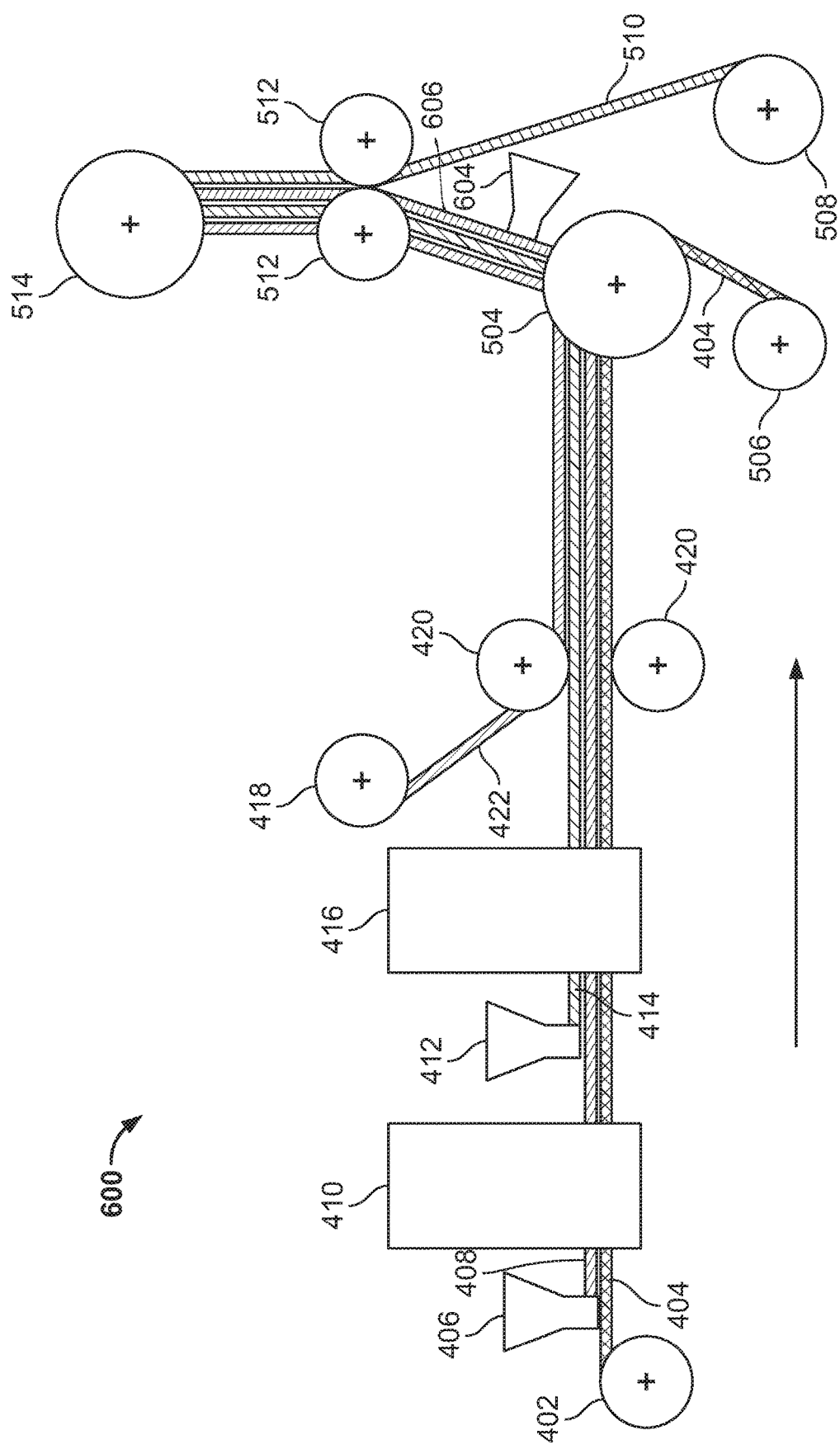
FIG. 6 illustrates another example riblet layering system.

FIG. 6 illustrates another example riblet layering system 600. The example riblet layering system 600 is similar to the riblet layering system 500 of FIG. 5, but also includes a masking polymer coating dispenser 604 to dispense the masking polymer coating (e.g. a wet coating masking polymer) 606 that may be used to as installation aid when a riblet applique is applied to an aircraft, for example.

In the illustrated example of FIG. 6, after the removal of the web tool 404 from the layer of the first fluorosilicone material 408 by the removal roll 506, the masking polymer coating dispenser 604 applies a coating to an exposed surface of the layer of the first fluorosilicone material 408 prior to the masking 510 being applied to the layer of the first fluorosilicone material 408 via the rollers 512 described above in connection with FIG. 5, thereby defining a finished riblet applique. In some examples, the coating is applied to the first fluorosilicone material 408 at the rollers 512 (e.g., the coating is directly applied to at least one of the rollers 512).

While the illustrated examples of FIGS. 4-6 depict first and second fluorosilicone materials 408, 414, respectively, any appropriate high elongation elastomer such as those described above in connection with FIG. 4 may be used in the examples disclosed herein.

Figure 7:
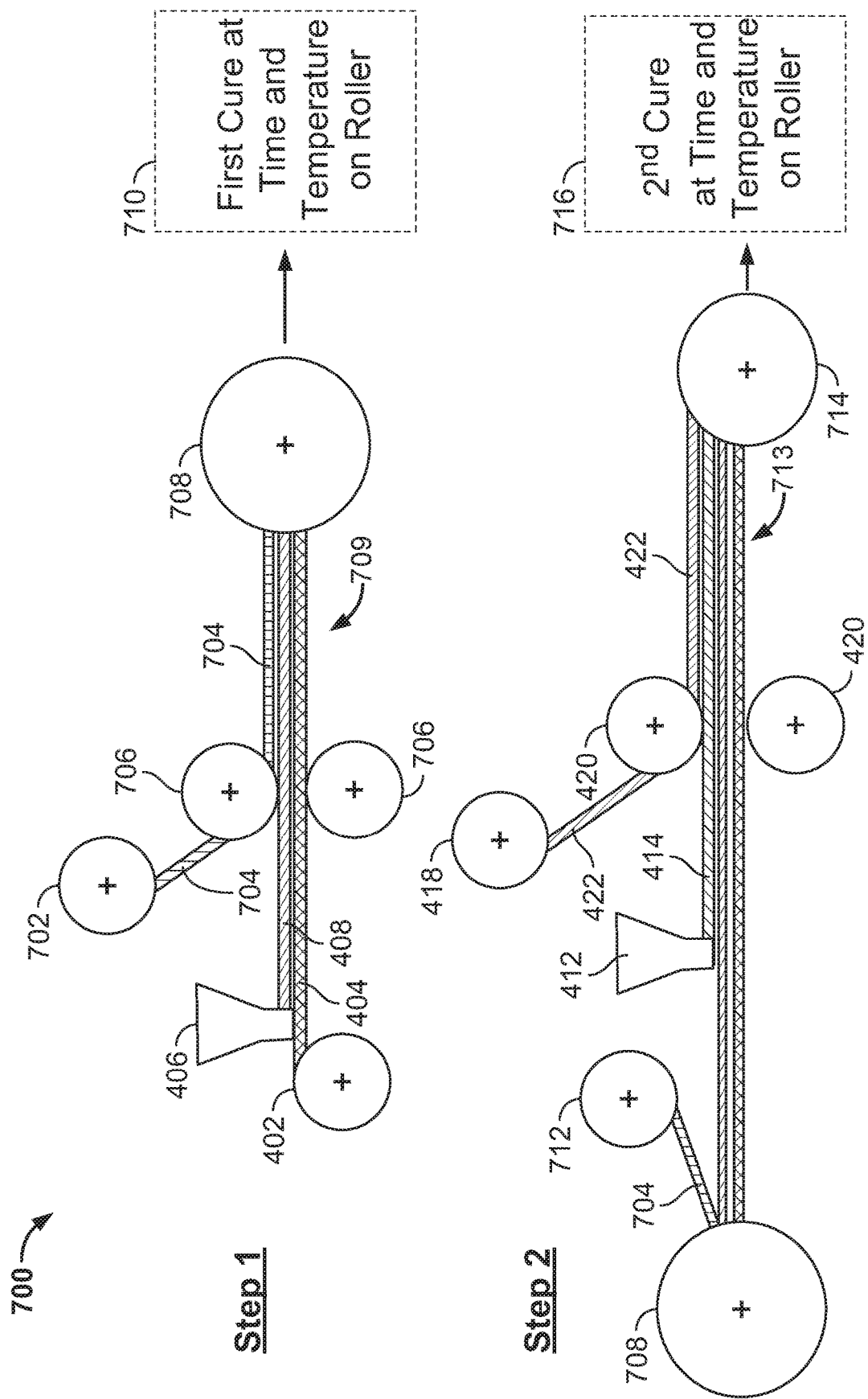
FIG. 7 illustrates another example riblet layering system.

FIG. 7 illustrates another example riblet layering system 700, which is a multi-stage process (e.g., a dual line assembly process), in contrast to the single stage processes of the example riblet layering systems 500, 600, 700 of FIGS. 5, 6 and 7, respectively. In this example, the example riblet layering system 700 includes the unwind roll 402 to supply the web tool 404, the first fluorosilicone material dispenser 406 to provide the first fluorosilicone material 408 or the first fluorosilicone layer, a riblet liner supply roll 702 that provides a riblet liner (e.g., a protective liner for later removal) 704, laminating nip rollers 706, and a first rewind roll 708. The example riblet layering system 700 also includes a first curing process (e.g., an oven, storage, room temperature heating, etc.) 710, a riblet liner removal roller 712, the second fluorosilicone material dispenser 412 to provide the second fluorosilicone material 414 or the second fluorosilicone layer, the support layer unwind roll 418, the support layer laminating rollers (e.g., nip rollers) 420 that apply the support layer 422 to the second fluorosilicone material 414, a rewind roll 714, and a second curing process 716.

To define (e.g., to cast, to mold, etc.) and cure the first fluorosilicone material 408 in a first stage/step of the illustrated example, the first fluorosilicone material 408 is applied (e.g., dispensed in liquid form) to the web tool 404 coming from the unwind roll 402. In this example, the first fluorosilicone material 408 is molded into a transparent structure having a pattern of riblet ridges with corresponding base surfaces. The riblet liner supply roll 702 of the illustrated example provides the riblet liner 704 that is applied to a first side of the first fluorosilicone material 408 that is opposite of a second side of the first fluorosilicone material 408 that is adjacent to the web tool 404. As a result of adding the riblet liner 704, a first layered construction 709 is defined. Subsequently, the first layered construction is stored on the first rewind roll 708. After the first layered construction has been placed onto the first rewind roll 708, the first rewind roll 708 is taken to the first curing process 710 to cure the first fluorosilicone material 408. In some examples, the curing process 710 includes an oven. Alternatively, the first curing process 710 includes allowing the first layered construction to cure (e.g., a non-accelerated curing process at or near room temperature, etc.). Regardless of which process is used for the first curing process 710, an advantage of curing the first layered construction on the roll/reel off-line is that this curing may be accomplished offsite (e.g., away from manufacturing lines) without delaying any additional inline processing steps.

To define and cure the second fluorosilicone material in a second stage/step of the illustrated example, the aforementioned first rewind roll 708, which includes the first layered construction is provided to a start of the second stage. In other words, the rewind roll 708 of the illustrated example acts as an unwind roll in the second stage/step. In this example, the first rewind roll 708 may be provided to the second stage after the first fluorosilicone material 408 and/or the first layered construction has had sufficient time to cure and/or partially cure (e.g., the first layered construction has cured while stored). In this example, the second fluorosilicone material 414 is provided (e.g., dispensed in liquid form) by the second fluorosilicone material dispenser 412 to an exposed surface of the first fluorosilicone material 408 after the riblet liner 704 has been removed by the removal roller 712. The support layer 422 of the illustrated example is provided from the support layer unwind roll 418 to the rollers 420 to laminate an exposed surface of the second fluorosilicone material 414, thereby defining a second layered construction 713, which is then provided to (e.g., moved towards via the web tool 404) and stored on the rewind roll 714. The second curing process 716 (e.g., curing via an oven and/or a room temperature curing process) is used to cure the second layered construction and/or the second fluorosilicone material 414. For example, the second curing process 716 may involve storing the rewind roll 714 at a specified temperature, applied heat and/or time. Additionally or alternatively, the rewind roll 714 is provided to the first curing process 710.

Figure 8:
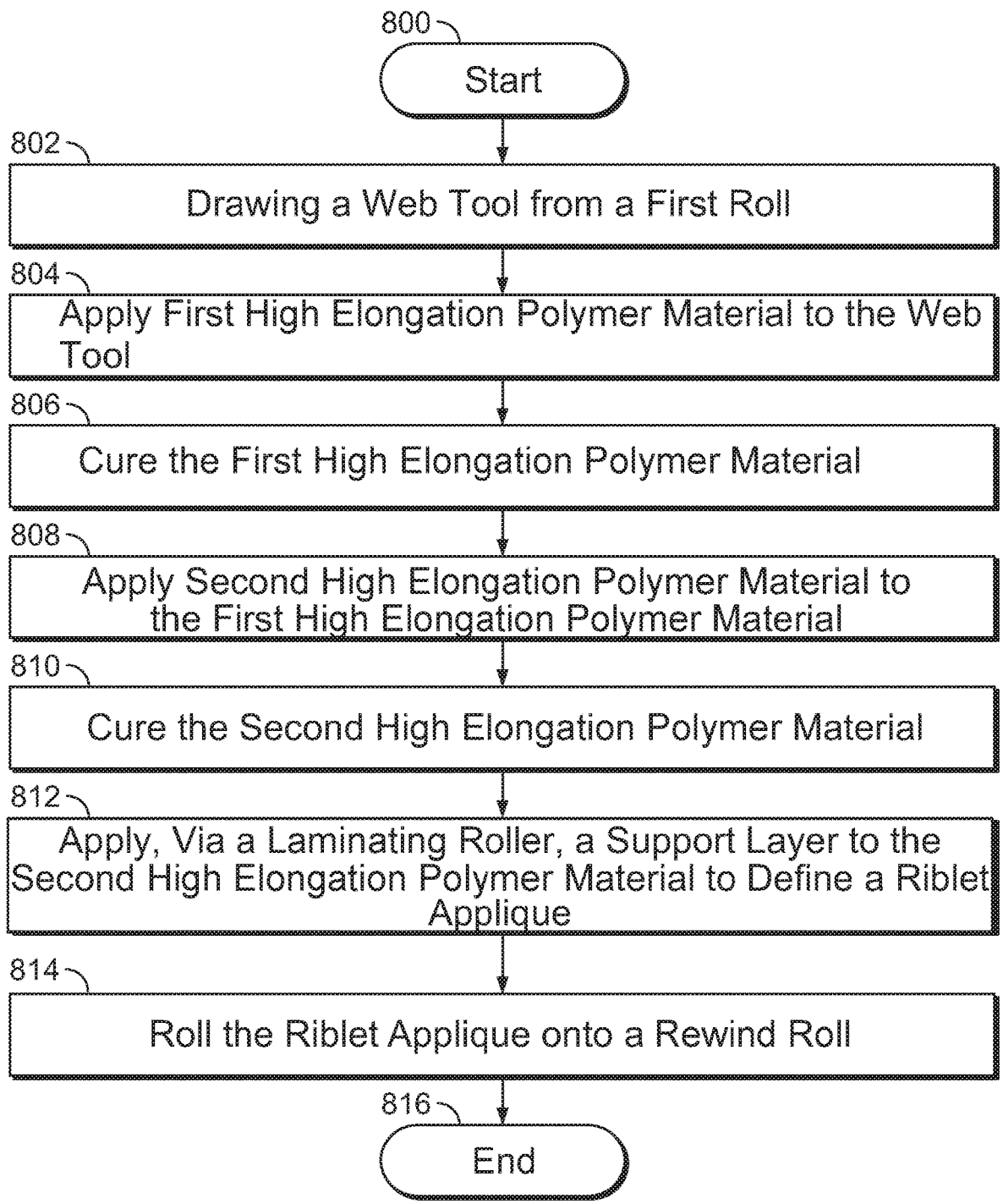
FIG. 8 is a flowchart representative of an example method that may be used to implement the examples disclosed herein.

FIG. 8 is a flowchart representative of an example method that may be used to implement the examples disclosed herein. The example method of FIG. 8 begins at block 800 where a multilayered construction riblet applique including a removable masking layer is about to be produced (block 800). In particular, the riblet applique is to be later assembled to an external surface of an aircraft.

A web tool (e.g., the web tool 404) is drawn, uncoiled and/or removed from a first roll (e.g., the unwind roll 402) while the first roll is rotated via a motor, for example (block 802).

Next, a first high elongation polymer material (e.g., the first fluorosilicone material 408) is applied to the web tool (block 804). For example, the first high elongation polymer material may be dispensed/provided as a liquid (e.g., in melted form) from a dispenser (e.g., the first fluorosilicone material dispenser 406) to contours and/or shapes of the web tool to solidify into the contours and/or the shapes, thereby producing/defining a riblet structure (e.g., a repeating pattern of ridges/wedges and valleys, etc.).

The first high elongation polymer material is then cured on the web tool (block 806). In some examples, the first high elongation polymer material may cure without a heating process (e.g., the first high elongation polymer material is cured or partially cured as the first high elongation polymer material moves along with the web tool). Additionally or alternatively, the first fluorosilicone material is cured by ultraviolet (UV) radiation, infrared (IR) and/or microwaves, etc. However, in this example, the web tool is moved through an oven (e.g., the first oven 410) to cure the first high elongation polymer material.

A second high elongation polymer material (e.g., the second fluorosilicone material 414) applied to the first high elongation polymer material (block 808). For example, the second high elongation polymer material 414 may be provided to the cured first fluorosilicone material via a dispenser (e.g., the second fluorosilicone material dispenser 412).

The second high elongation polymer material is then cured (block 810). In this example, a second oven (e.g., the second oven 416) is used to provide heat to the second high elongation polymer material, thereby curing the second high elongation polymer material. In some examples, the first high elongation polymer material is at least partially cured in the second oven (e.g., the full cure of the first high elongation polymer material occurs in the second oven).

Next, a support layer (e.g., the support layer 422) is applied to the second high elongation polymer material and/or outermost high elongation polymer material (e.g., for more than two high elongation polymer materials) via a laminating roller to define a riblet applique (block 812). In this example, the support layer is applied (e.g., laminated) to an exposed surface of the second high elongation polymer material via pinch rollers (e.g., the rollers 420). The riblet applique of the illustrated example is then rolled/placed onto a rewind roll (block 814) and the process ends (block 816).

Figure 9:
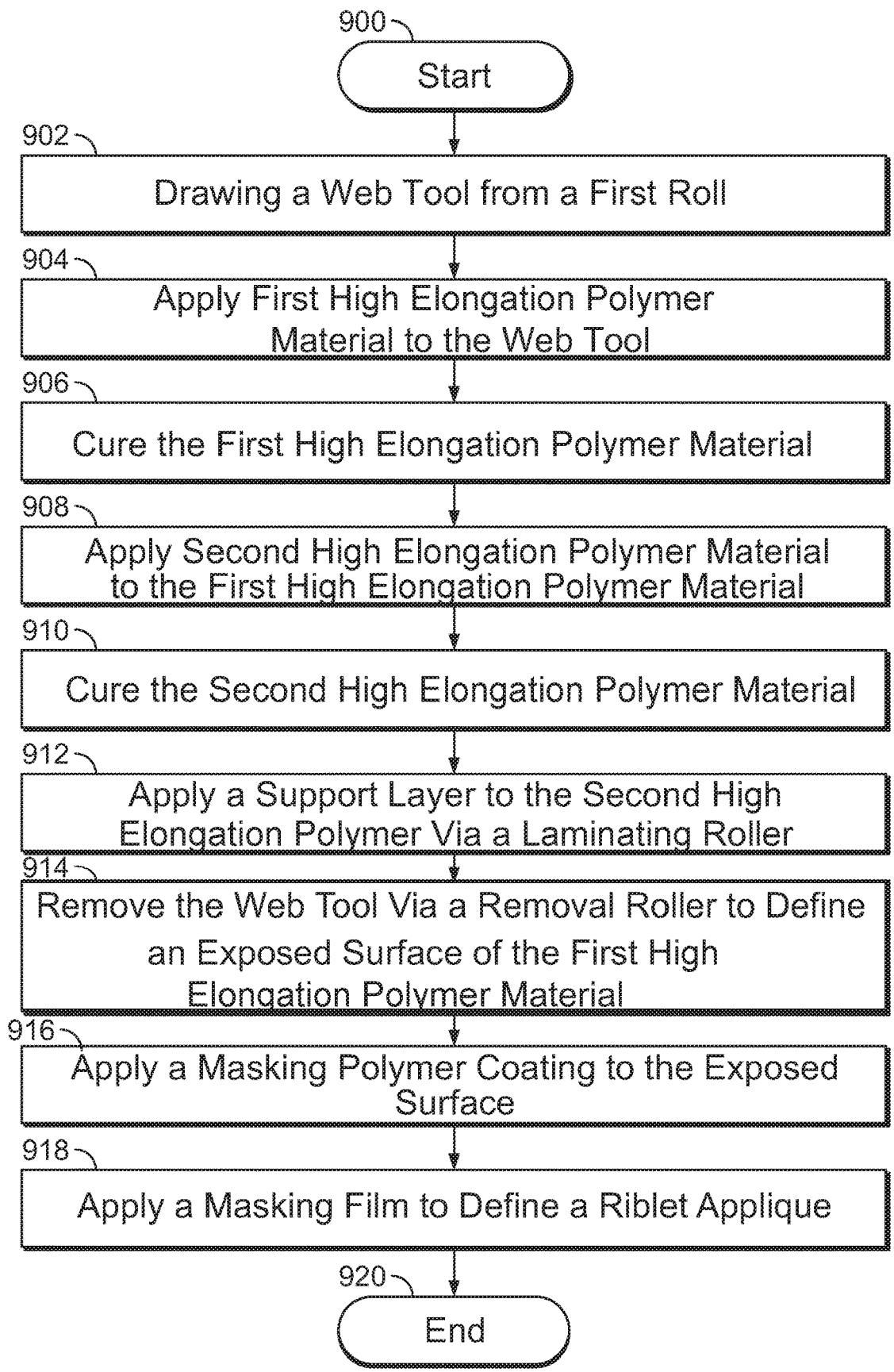
FIG. 9 is another flowchart representative of an example method that may be used to implement the examples disclosed herein.

FIG. 9 is another flowchart representative of an example method that may be used to implement the examples disclosed herein. The example process of FIG. 9 begins at block 900 where a multilayer riblet applique is to be produced using a single line process in which a protective masking is applied to the riblet applique (block 900).

A web tool (e.g., the web tool 404) is drawn and/or provided from a first roll (e.g., the unwind roll 402), which may be motorized (block 902). For example, the web tool may be unwound/uncoiled from the first roll as the first roll is rotated.

A first high elongation polymer material (e.g., the first fluorosilicone material 408) is applied (e.g., dispensed) to the web tool (block 904). In this example, the first high elongation polymer material is cured via an oven such as the oven 410 during an inline curing process (block 906). In particular, the first high elongation polymer material is moved within the oven by the web tool for a defined time and/or rate of movement. However, in other examples, the first high elongation polymer material is cured later in the applique production process.

A second high elongation polymer material is applied to the first high elongation polymer material (block 908). For example, the second high elongation polymer material may be directly applied to the first high elongation polymer material while the second high elongation polymer material is in a liquid state (e.g., melted). In this example, the second high elongation polymer material is a color layer.

In this example, the second high elongation polymer material is cured within an inline oven (e.g., the second oven 416) (block 910). However, in other examples, the second high elongation polymer material is cured later in the assembly process and/or cured when the applique is later stored.

A support layer (e.g., the support layer 422) is applied to the second high elongation polymer material via a laminating roller (e.g., the rollers 420) (block 912). In some examples, nip rollers are used to apply the support layer. Next, the web tool is removed via a removal roll (e.g. the removal roll 506) to define an exposed surface of the first high elongation polymer material (block 914).

In some examples, a masking polymer coating is applied and/or compressed to the exposed surface via a masking polymer coating dispenser such as the masking polymer coating dispenser 604 of FIG. 6 (block 916). Next, a masking film (e.g., the masking 510) is applied to define a riblet applique via pinch rollers (e.g., the rollers 512), for example, (block 918) and the process ends (block 920).

Figure 10:
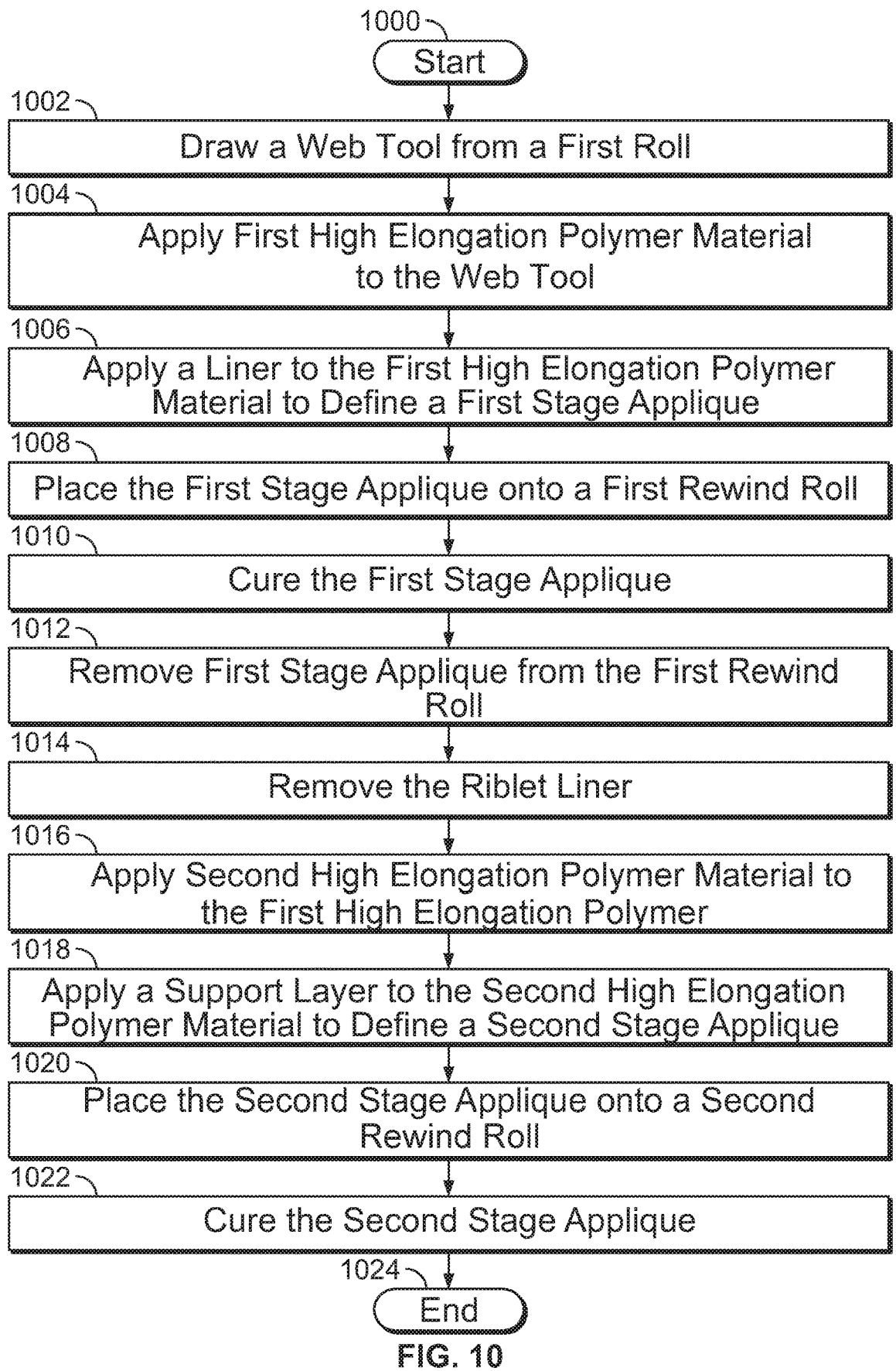
FIG. 10 is another flowchart representative of an example method that may be used to implement the examples disclosed herein.

FIG. 10 is another flowchart representative of an example method that may be used to implement the examples disclosed herein. The process of FIG. 10 begins at block 1000 where a multilayered riblet applique is to be produced via a multiple line/step process (e.g., a multistage curing process) (block 1000).

A web tool (e.g., the web tool 404) is drawn and/or provided from a first roll (e.g., the unwind roll 402) (block 1002). For example, the web tool may be unwound/uncoiled from the first roll as the first roll is rotated.

A first high elongation polymer material (e.g., the first fluorosilicone material 408) is applied (e.g., dispensed) to the web tool (block 1004). In this example, a liner is applied to the first fluorosilicone material, thereby defining a first stage applique (block 1006). The first stage applique is then placed (e.g., coiled) onto a first rewind roll (block 1008).

In this example, the first stage applique is cured on the first rewind roll (block 1010). In some examples, the first rewind roll is exposed to with heat (e.g., the first rewind roll is placed within an oven). Additionally or alternatively, the first rewind roll is placed in an area (e.g., an enclosure, a temperature controlled enclosure, etc.) and the first fluorosilicone material is given a sufficient time duration to allow curing or partial curing.

In this example, after the first high elongation polymer material of the first stage applique has cured, the first stage applique is removed from the first rewind roll (block 1012). In particular, the first stage applique of the illustrated example is uncoiled and provided to a roller system for further assembly and/or layering.

Next, the riblet liner is removed from the first stage applique (block 1014). In particular, removal of the riblet liner exposes a surface of the first high elongation polymer material.

A second high elongation polymer material (e.g., the second fluorosilicone material 414) is applied to the first high elongation polymer material (block 1016). In this example, the second high elongation polymer material is applied in a liquid/melted state to the exposed surface of the first high elongation polymer material. Next, a support layer is applied, via nip rollers (e.g., the rollers 420), to the second high elongation polymer material to define a second stage applique (block 1018). The second stage applique is then placed onto a second rewind roll (block 1020).

In this example, the second stage applique is cured on the second rewind roll (block 1022) and the process ends (block 1024). In some examples, the second rewind roll may be placed within an oven, for example. Additionally or alternatively, in some examples, the second stage applique is at least partially cured while being stored in a temperature controlled environment, for example, prior to being applied to a surface of an aircraft. In some examples, masking and/or polymer coatings are subsequently added to the second stage applique.

From the foregoing, it will be appreciated that the above disclosed methods, apparatus and articles of manufacture enable an efficient (e.g., offline curing stages in two-stage assembly processes, etc.) and effective layer construction of riblet applique. In particular, the examples disclosed herein enable a robust layering of multilayer riblet applique that is highly resistant to separation (e.g., internal layer separation, delamination, etc.). In particular, the curing/heating processes and/or use of laminating/nip/pinch rollers of the examples disclosed herein allows for greater interlayer bond effectiveness.

This patent arises as a divisional of U.S. patent application Ser. No. 15/205,460, entitled "MULTILAYER RIBLET APPLIQUE AND METHODS OF PRODUCING THE SAME," filed Jul. 8, 2016. Priority to U.S. patent application Ser. No. 15/205,460 is hereby claimed. U.S. patent application Ser. No. 15/205,460 is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described in the examples disclosed herein, the examples disclosed herein may be applied to vehicles, aerodynamic structures, etc.

What is claimed is:

1. A multilayer riblet applique comprising:
    a fluorosilicone riblet structure including riblet ridges and a base from which the riblet ridges extend;
    a fluorosilicone layer adjacent the base on a first side of the fluorosilicone layer; and
    a support layer adjacent the fluorosilicone layer on a second side of the fluorosilicone layer opposite the first side, the support layer including:
        a metal sub-layer adjacent the fluorosilicone layer,
        an adhesive sub-layer, and
        a first thermoplastic sub-layer and a second thermoplastic sub-layer between the metal sub-layer and the adhesive sub-layer, wherein the first thermoplastic sub-layer and the second thermoplastic sub-layer are different materials.

2. The multilayer riblet applique as defined in claim 1, further including a masking adjacent the fluorosilicone riblet structure.

3. The multilayer riblet applique as defined in claim 2, further including a polymer coating between the masking and the fluorosilicone riblet structure.

4. The multilayer riblet applique as defined in claim 1, wherein the fluorosilicone layer includes a color layer.

5. The multilayer riblet applique as defined in claim 1, wherein the fluorosilicone riblet structure includes a repeating pattern of ridges and valleys.

6. An aircraft component including the multilayer riblet applique as defined in claim 1 applied thereto.

7. An aircraft having a plurality of surfaces with the multilayer riblet applique as defined in claim 1 applied thereto.

8. The multilayer riblet applique as defined in claim 1, wherein at least one of the first thermoplastic sub-layer or the second thermoplastic sub-layer includes at least one of polyether ether ketone (PEEK), polyether ketone ketone (PEKK), or polyether amide (PEI).

9. The multilayer riblet applique as defined in claim 1, wherein the fluorosilicone layer and the fluorosilicone riblet structure include different materials from one another.

10. The multilayer riblet applique as defined in claim 1, wherein the riblet ridges are spaced apart at distances in a range from 10 microns to 200 microns.

11. The multilayer riblet applique as defined in claim 1, wherein the riblet ridges include a triangular cross-sectional profile.

12. The multilayer riblet applique as defined in claim 1, wherein riblet ridges are transparent.

13. The multilayer riblet applique as defined in claim 1, further including a removable liner coupled to the adhesive sub-layer.

14. An apparatus to produce a multilayered riblet applique comprising:
    a first dispenser to apply a first fluorosilicone material to a web tool that is unrolled from a first roll, the first fluorosilicone material including riblet ridges and a base from which the riblet ridges extend;
    a second dispenser to apply a second fluorosilicone material to the first fluorosilicone material so that a first side of the second fluorosilicone material is adjacent to the first fluorosilicone material; and
    a laminating roller to couple a support layer to the second fluorosilicone material adjacent a second side of the second fluorosilicone material opposite of the first side, the support layer including a metal sub-layer adjacent the fluorosilicone layer, an adhesive sub-layer, and first and second thermoplastic sub-layers between the metal sub-layer and the adhesive sub-layer, wherein the first thermoplastic sub-layer and the second thermoplastic sub-layer are different materials.

15. The apparatus as defined in claim 14, further including:

a first inline oven to cure the first fluorosilicone material onto the web tool via a first heating process; and a second inline oven to cure the second fluorosilicone material onto the first fluorosilicone material via a second heating process.

16. The apparatus as defined in claim 15, wherein at least one of the first and second ovens includes a conveyor moving therethrough to transport the multilayered riblet applique.

17. A method of producing a multilayered riblet applique, the method comprising:

coupling a fluorosilicone riblet structure to a fluorosilicone layer on a first side of the fluorosilicone layer, the fluorosilicone riblet structure including riblet ridges and a base from which the riblet ridges extend; and coupling a support layer to the fluorosilicone layer on a second side of the fluorosilicone layer opposite the first side, the support layer including:

a metal sub-layer adjacent the fluorosilicone layer, an adhesive sub-layer, and first and second thermoplastic sub-layers between the metal sub-layer and the adhesive sub-layer, wherein the first thermoplastic sub-layer and the second thermoplastic sub-layer are different materials.

18. The method as defined in claim 17, further including:

curing, via a first inline oven, the fluorosilicone riblet structure; and curing, via a second inline oven, the fluorosilicone layer.

19. The method as defined in claim 17, further including moving, via a conveyor, the fluorosilicone riblet structure and the fluorosilicone layer.

20. The method as defined in claim 17, further including applying a masking to the multilayered riblet applique.

* * * * *